(12) United States Patent
Feger et al.

(10) Patent No.: US 7,651,139 B2
(45) Date of Patent: Jan. 26, 2010

(54) COUPLING FOR A FLUID LINE ARRANGEMENT

(75) Inventors: Axel Feger, Lorrach (DE); Daniel Utz, Bad Bellingen (DE)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 12/063,064

(22) PCT Filed: Jul. 6, 2006

(86) PCT No.: PCT/EP2006/006592

§ 371 (c)(1),
(2), (4) Date: Feb. 6, 2008

(87) PCT Pub. No.: WO2007/019916

PCT Pub. Date: Feb. 22, 2007

(65) Prior Publication Data

US 2008/0258460 A1 Oct. 23, 2008

(30) Foreign Application Priority Data

Aug. 12, 2005 (DE) .................. 10 2005 038 397

(51) Int. Cl.
*F16L 37/00* (2006.01)
(52) U.S. Cl. ...................... 285/374; 285/305
(58) Field of Classification Search ............... 285/345, 285/374, 305, 338, 342, 344, 231, 230, 237
See application file for complete search history.

(56) References Cited

U.S. PATENT DOCUMENTS

| 2,146,641 | A | * | 2/1939 | McWane | 285/374 |
|---|---|---|---|---|---|
| 2,469,516 | A | * | 5/1949 | Pearson | 285/345 |
| 2,966,539 | A | * | 12/1960 | Sears et al. | 174/47 |
| 3,041,077 | A | * | 6/1962 | Osterloh et al. | 285/230 |
| 3,081,102 | A | | 3/1963 | Murray et al. | |
| 3,272,538 | A | * | 9/1966 | Bergstrom | 285/231 |
| 3,315,971 | A | * | 4/1967 | Sakurada | 285/345 |
| 3,368,830 | A | | 2/1968 | French | |
| 3,544,119 | A | * | 12/1970 | Glover | 285/345 |
| 3,584,889 | A | | 6/1971 | Sheets | |
| 3,684,320 | A | * | 8/1972 | Platzer et al. | 285/374 |
| 3,720,428 | A | * | 3/1973 | Zastawny | 285/374 |
| 3,741,570 | A | * | 6/1973 | Garrett | 285/231 |
| 3,891,224 | A | | 6/1975 | Ditcher | |
| 4,147,368 | A | | 4/1979 | Baker et al. | |
| 5,058,907 | A | * | 10/1991 | Percebois et al. | 285/231 |
| 5,197,768 | A | * | 3/1993 | Conner | 285/105 |

FOREIGN PATENT DOCUMENTS

| DE | 7118924 U | 9/1971 |
|---|---|---|
| DE | 2833676 A1 | 2/1980 |
| DE | 29903469 U1 | 8/1999 |
| DE | 20016118 U1 | 12/2000 |
| DE | 10246096 A1 | 4/2004 |

\* cited by examiner

*Primary Examiner*—David E Bochna
(74) *Attorney, Agent, or Firm*—Baker & Daniels LLP

(57) ABSTRACT

The invention relates to a coupling for a fluid line arrangement, said coupling being characterised in that a plane outer side (8) of at least one essentially D-shaped sealing ring (7) of a sealing unit is applied to a plane supporting layer (10) of a receiving section (3) of a coupling part (1). In this way, in addition to a high twist rigidity of the sealing ring (7) in question, a very effective sealing action is achieved, even in the presence of comparatively weak radial pressure forces.

4 Claims, 2 Drawing Sheets

COUPLING FOR A FLUID LINE ARRANGEMENT

CROSS-REFERENCE TO RELATED APPLICATION

This application is a U.S. National Phase Patent Application based on International Application Serial No. PCT/EP2006/006592 filed Jul. 6, 2006, the disclosure of which is hereby explicitly incorporated by reference herein.

BACKGROUND OF THE INVENTION

1. Field of the Invention

The present invention provides a coupling for a fluid line arrangement.

2. Description of the Related Art

One known coupling for a fluid line arrangement is known from U.S. Pat. No. 4,147,368. The prior coupling comprises a coupling part provided with a sealing unit that is in the form of a sealing ring and by means of which the coupling part and an insert part that can be fitted into the coupling part can be sealed against each other. The sealing ring is disposed in a circumferential, recessed receiving groove provided in the inner wall of the coupling part, has a radially outwardly disposed, planar outer side that contacts a planar support surface of the receiving groove, and is configured with a radially inwardly oriented, arcuate inner side, edge faces oriented at right angles to the outer side being configured between the outer side and the inner side.

U.S. Pat. No. 3,584,889 and U.S. Pat. No. 3,368,830 each disclose a coupling for a fluid line arrangement, in which a coupling part in the form of a sleeve extending between two line ends of the fluid line arrangement is configured endwise with rectangular sealing-ring receptacles formed by radially broadening the sleeve. In U.S. Pat. No. 3,584,889, a sealing ring having a radially outwardly disposed, planar outer side and an inwardly oriented, arcuate inner side is fitted into each of the sealing-ring receptacles, edge faces oriented at right angles to the outer side and comprising axially projecting elevations being configured between the outer side and the inner side. In U.S. Pat. No. 3,368,830, a sealing ring having a radially outwardly disposed, planar outer side and an inwardly oriented inner side is fitted into each of the sealing-ring receptacles, the inner side being provided with a number of flexible ribs that are deformable and fit themselves to the line ends of the fluid line arrangement.

Known from DE 200 16 118 U1 is a fluid line arrangement with a complexly configured seal exhibiting various curvatures, grooves and flat sides.

Known from DE 299 03 469 U1 is a fluid line arrangement with annular seals configured with hooks.

Known from U.S. Pat. No. 3,891,224 is a D-shaped seal for a manhole composed of ring segments, which seal has a radially outwardly disposed, planar outer side and a radially inwardly oriented, arcuate inner side, with edge faces oriented at right angles to the outer side extending between the outer side and the inner side. The seal is configured with an inner cavity and contacts, by an edge face, an abutment step configured in a ring segment.

Known from U.S. Pat. No. 3,081,102 is a fluid line arrangement comprising a seal having dome-like and finger-like elevations.

Known from DE 101 15 399 C1 is a coupling that is to be integrated into a fluid line arrangement and comprises a coupling part provided with a sealing unit having at least one sealing ring. The sealing unit of the prior coupling comprises two sealing rings of round cross section and an intermediate ring disposed between the sealing rings, and is intended to seal against each other the coupling part and an insert part that can be fitted into the coupling part.

SUMMARY OF THE INVENTION

The present invention provides a coupling for a fluid line arrangement which is configured as comparatively small in cross section and in which the, or each, sealing ring is reliably secured against twisting and dropout.

By virtue of the fact that the sealing unit is provided with a retaining collar having oblique walls and projecting beyond the planar support surface; a step with a contact surface; and a sealing ring that is disposed in back of the retaining collar in the insertion direction of the insert part and that has, visually speaking, a D shape in which the outer side and the inner side merge directly into each other, despite the slender construction of the coupling, the or each sealing ring is secured against dropout and the twisting rigidity of the particular sealing ring is appreciably increased compared to a roundish cross section, thereby appreciably reducing the risk that it will twist portionally on itself.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
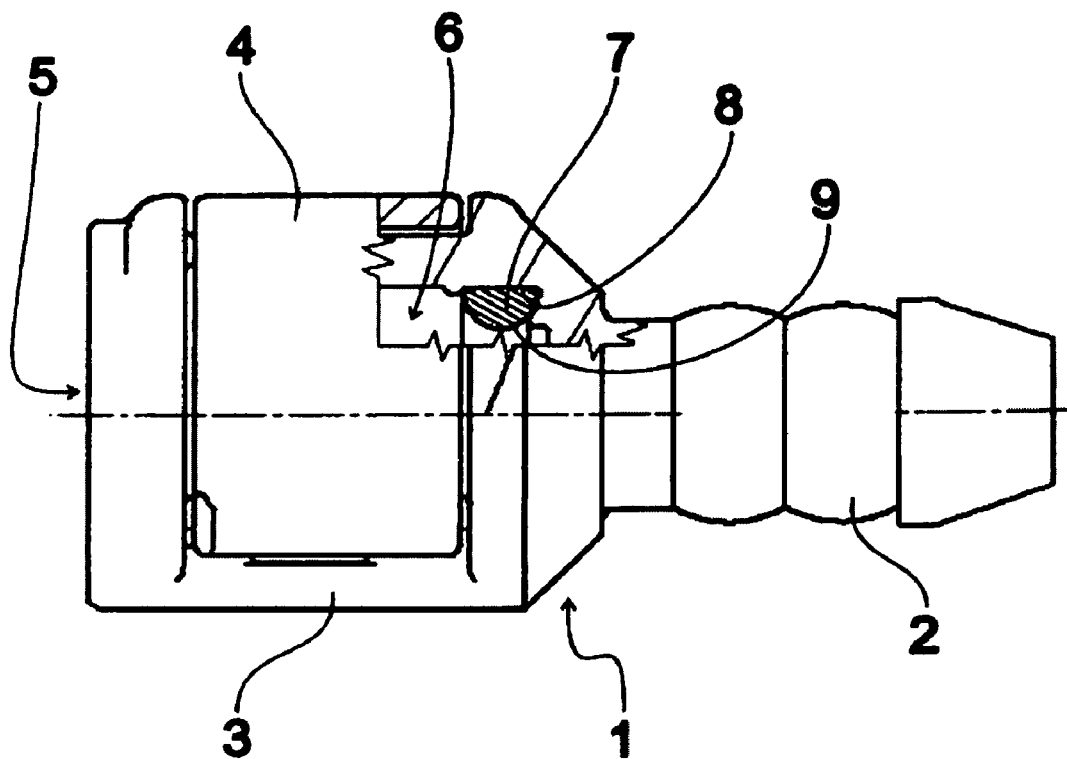
FIG. 1 is a partially cut-away side view of an exemplary embodiment of a coupling according to the invention, comprising a sealing unit equipped with a single D-shaped sealing ring.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DETAILED DESCRIPTION

FIG. 1 is a partially cut-away side view of an exemplary embodiment of a coupling according to the invention. The illustrated coupling according to the invention comprises a coupling part 1, which is fitted with an adapter 2 for connection to, for example, a hose of a fluid line arrangement not shown in FIG. 1. The coupling part 1 is also provided with a receiving portion 3, which is larger in circumference than the adapter 2 and in this exemplary embodiment includes a receptacle for a locking clamp 4, by means of which an insert part not shown in FIG. 1 can be locked against accidentally slipping out of receiving portion 3 after being fitted into receiving portion 3 from an insertion side 5 of coupling part 1 that is disposed oppositely from adapter 2 in an insertion direction pointing from insertion side 5 toward adapter 2. In this way, the insert part is disposed operationally reliably in a substantially cylindrical receiving space 6 that is surrounded by receiving portion 3.

The coupling according to the invention further comprises a sealing unit, which in the illustrated exemplary embodiment is formed by an annularly closed sealing ring 7. The sealing ring 7 is configured in the illustrated exemplary embodiment with a planar outer side 8 that in the intended arrangement faces outward, and has an arcuate inner side 9 that extends between the edge faces of planar side 8 and is oriented radially inward. In the illustrated exemplary embodiment, the sealing ring 7 has a substantially semicircular cross section and, in stretched-out arrangement, a semicylindrical shape, the planar outer side 8 being disposed in the plane of symmetry if the cross section were complemented to form a full circle or a full cylinder.

In other useful configurations not depicted here, the arcuate inner side 9 of sealing ring 7 forms a partial circumference of a circle spanning an angular range of less than or more than 180 degrees, such that planar outer side 8 is outside the center of the corresponding full circle.

In other useful configurations, arcuate inner side 9 has an elliptical outer surface and planar outer side 8 either is disposed in one of the two planes of symmetry of the ellipse, for a symmetrical configuration of the sealing ring 7, or is offset in parallel to one of said planes should an asymmetrical configuration be useful.

Figure 2:
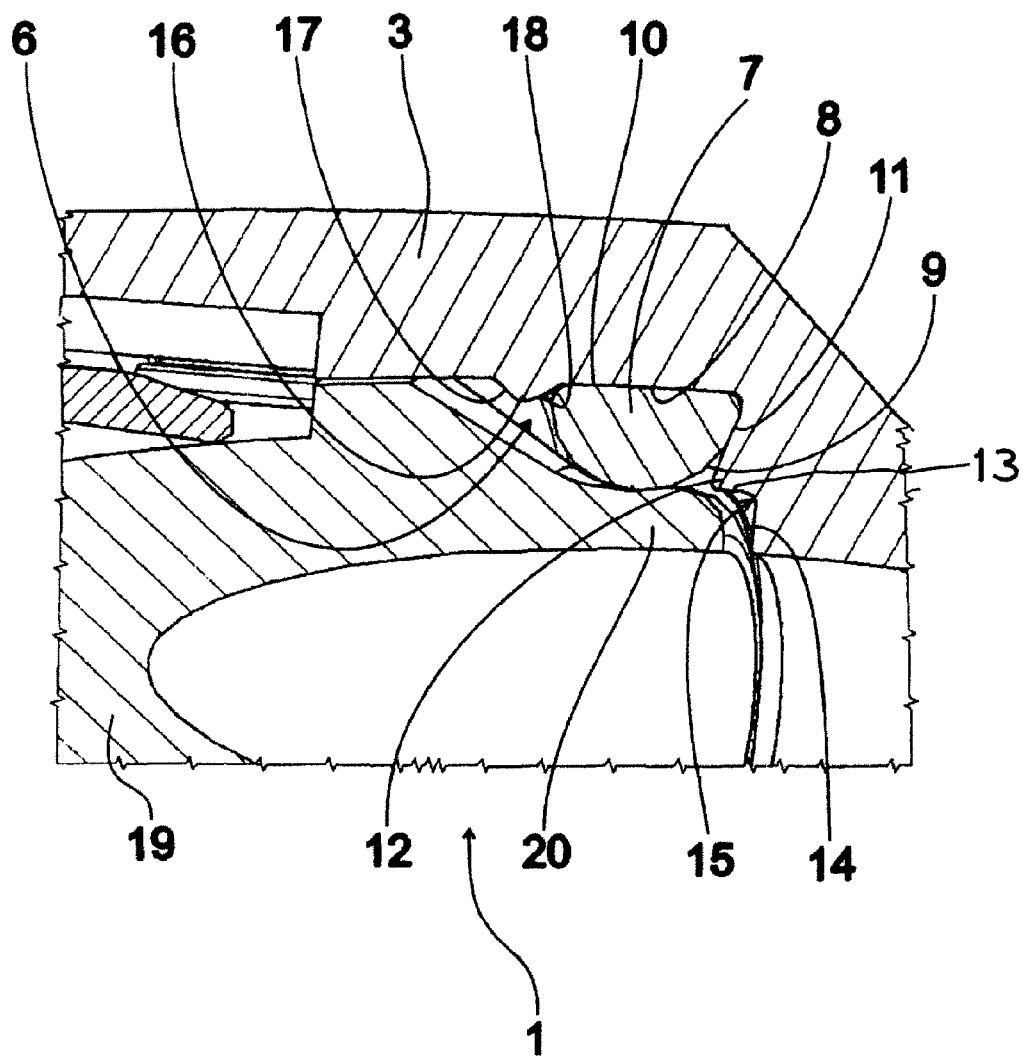
FIG. 2 is a sectional view of the exemplary embodiment according to FIG. 1 in the region of the sealing ring, with an insert part fitted into the coupling part.

FIG. 2 is a sectional view of the exemplary embodiment according to FIG. 1 in the region of sealing ring 7. As is clearly discernible from FIG. 2, the radially outward lying, planar outer side 8 of sealing ring 7 contacts an also planarly configured support surface 10 of coupling part 1, resulting in very good sealing action even in the presence of very weak radially outwardly acting forces, due to the large area of contact between outer side 8 and support surface 10. Formed adjacently to support surface 10 is a rear contact surface 11 of a step 12 that projects axially against the insertion direction, while a play compensating space 15 is present between a radially inwardly directed sealing wall 13 and an abutment wall 14 that is part of coupling part 1 and extends substantially in the radial direction.

It is also clear from the representation according to FIG. 2 that configured on the edge region of planar support surface 10 that is in front in the insertion direction is a radially inwardly projecting retaining collar 16 having a front wall 17 located in front in the insertion direction and a rear wall 18 positioned in back in the insertion direction. Retaining collar 16 secures sealing ring 7 against accidentally slipping out of coupling part 1, rear wall 18 usefully having a smaller inclination than front wall 17 so that deformation can occur without damage.

Also depicted in FIG. 2 is an insert part 19, which, analogously to coupling part 1, can be connected for example to a hose of a fluid line arrangement, also not shown in FIG. 2, to create a fluid connection to the hose connected to coupling part 1. In FIG. 2, insert part 19 is depicted in the intended arrangement for creating the fluid connection, in which an end portion 20 of insert part 19 that is in front in the insertion direction comes into contact by its radial outer side with the substantially radially inwardly oriented portions of arcuate outer side 9 and slightly deforms sealing ring 7, while a wall region of arcuate inner side 9 that is in back in the insertion direction rests against contact surface 11 to bring about sealing action in the region of end portion 20. Taken all together, this gives the inventive coupling a comparatively high ability to accommodate production tolerances in the radial direction.

It can further be appreciated from FIG. 2 that when insert part 19 is arranged as intended between the front face, i.e., that located in front in the insertion direction, of end portion 12 of insert part 19 and the abutment wall 14 of coupling part 1, a greater tolerance range is also provided in the axial direction, by compensating space 15.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A coupling for use with a fluid line arrangement and defining perpendicular axial and radial directions, said coupling comprising:
   a coupling part having at least one sealing ring;
   an insert part sealingly insertable into said coupling part along an insertion direction;
   said sealing ring further comprising:
      a radially outwardly facing, planar outer side contacting a planar support surface of said coupling part; and
      a radially inwardly facing, arcuate inner side extending between edge faces of said planar outer side, said sealing ring having a semicircular cross section; and
   said coupling part further comprising:
      a retaining collar disposed axially in front of said planar support surface with respect to the insertion direction, said retaining collar projecting radially inwardly beyond said planar support surface and having an obliquely upwardly sloping front wall and an obliquely downwardly sloping rear wall, each with respect to the insertion direction, said retaining collar further comprising a front wall and a rear wall with respect to the insertion direction, said front wall more steeply pitched than said rear wall; and
      a step projecting axially against the insertion direction and including a rear contact surface, said planar outer side and said arcuate inner side of said sealing ring disposed between said retaining collar and said rear contact surface.

2. The coupling of claim 1, wherein said edge faces of said radially outwardly facing, planar outer side of said sealing ring respectively engage said retaining collar and said step when said insert part is not inserted into said coupling part.

3. A coupling for use with a fluid line arrangement and defining perpendicular axial and radial directions, said coupling comprising:
   a coupling part having at least one sealing ring and a locking clamp;
   an insert part sealingly insertable into said coupling part along an insertion direction;
   said sealing ring further comprising:
      a radially outwardly facing, planar outer side contacting a planar support surface of said coupling part; and
      a radially inwardly facing, arcuate inner side extending between edge faces of said planar outer side, said sealing ring having a semicircular cross section; and
   said coupling part further comprising:
      a retaining collar disposed axially in front of said planar support surface with respect to the insertion direction, said retaining collar projecting radially inwardly beyond said planar support surface and having an obliquely upwardly sloping front wall and an obliquely downwardly sloping rear wall, each with respect to the insertion direction; and
      a step projecting axially against the insertion direction and including a rear contact surface, said planar outer side and said arcuate inner side of said sealing ring disposed between said retaining collar and said rear contact surface.

4. The coupling of claim 3, wherein said edge faces of said radially outwardly facing, planar outer side of said sealing ring respectively engage said retaining collar and said step when said insert part is not inserted into said coupling part.

* * * * *